US012696352B2

(12) United States Patent
Trussler et al.

(10) Patent No.: US 12,696,352 B2
(45) Date of Patent: Jul. 28, 2026

(54) HEATING SYSTEM AND METHOD OF HEATING A PROCESS MEDIUM

(71) Applicant: Chromalox, Inc., Pittsburgh, PA (US)

(72) Inventors: Richard Mark Trussler, Pittsburgh, PA (US); Walter Thomas Robinson, Pittsburgh, PA (US); Jie Chen, Pittsburgh, PA (US)

(73) Assignee: Chromalox, Inc., Pittsburgh, PA (US)

(*) Notice: Subject to any disclaimer, the term of this patent is extended or adjusted under 35 U.S.C. 154(b) by 965 days.

(21) Appl. No.: 17/512,041

(22) Filed: Oct. 27, 2021

(65) Prior Publication Data

US 2023/0130591 A1 Apr. 27, 2023

(51) Int. Cl.
*H05B 1/02* (2006.01)
*H05B 3/00* (2006.01)

(52) U.S. Cl.
CPC ......... *H05B 1/0244* (2013.01); *H05B 3/0019* (2013.01); *H05B 2203/021* (2013.01)

(58) Field of Classification Search
CPC ............ H05B 2203/021; H05B 3/0019; H05B 1/0244; Y02E 10/40; Y02E 10/56; Y02E 10/70; Y02E 10/20
USPC .......................................................... 219/268
See application file for complete search history.

(56) References Cited

U.S. PATENT DOCUMENTS

| | | | | | |
|---|---|---|---|---|---|
| 4,554,501 | A * | 11/1985 | Baker | H02P 9/42 | 322/29 |
| 10,690,705 | B2 | 6/2020 | Breitlow et al. | | |
| 2003/0227172 | A1* | 12/2003 | Erdman | F03D 7/048 | 290/44 |
| 2009/0140577 | A1* | 6/2009 | Fishman | H02M 7/49 | 307/82 |

(Continued)

FOREIGN PATENT DOCUMENTS

| | | | |
|---|---|---|---|
| AU | 2013100349 | A4 * | 5/2013 |
| CN | 208 976 494 | U | 6/2019 |

(Continued)

OTHER PUBLICATIONS

Gottlieb, I. (1998). Practical transformer handbook : For electronics, radio and communications engineers. Elsevier Science & Technology, pp. 52-54 (Year: 1998).*

(Continued)

*Primary Examiner* — Topaz L. Elliott
*Assistant Examiner* — Daniel Ward Hatten
(74) *Attorney, Agent, or Firm* — Faegre Drinker Biddle & Reath LLP

(57) ABSTRACT

The present disclosure relates to a heating system comprising: a heating arrangement for heating a process medium; an inverter configured to receive an input direct-current voltage from a power supply and to produce an intermediate alternating-current voltage; a transformer configured to receive the intermediate alternating-current voltage produced by the inverter and to supply an output alternating-current voltage (Continued)

to the heating arrangement; a sensor arrangement configured to generate a first sensor output signal indicative of a thermodynamic parameter of the process medium or the heating arrangement; and a controller configured to control the inverter based on the first sensor output signal.

20 Claims, 5 Drawing Sheets

(56) References Cited

U.S. PATENT DOCUMENTS

| | | | | |
|---|---|---|---|---|
| 2011/0216562 | A1* | 9/2011 | Gengenbach | H02M 1/126<br>363/71 |
| 2012/0281444 | A1* | 11/2012 | Dent | H02J 3/388<br>363/131 |
| 2022/0026285 | A1* | 1/2022 | Liu | G01K 7/16 |
| 2022/0026881 | A1* | 1/2022 | Lindley | G05B 17/00 |
| 2023/0111730 | A1* | 4/2023 | Scobie | H02M 1/4208<br>363/37 |

FOREIGN PATENT DOCUMENTS

| | | | | | |
|---|---|---|---|---|---|
| CN | 109 728 382 | B | | 3/2021 | |
| CN | 113316278 | A | * | 8/2021 | H05B 6/06 |
| WO | WO-2023023775 | A1 | * | 3/2023 | |

OTHER PUBLICATIONS

Extended European Search Report dated Mar. 2, 2023 issued in EP 22195714.5 (9 pages).

* cited by examiner

HEATING SYSTEM AND METHOD OF HEATING A PROCESS MEDIUM

FIELD OF THE INVENTION

The present disclosure relates to a heating system for heating a process medium. It relates further to an installation comprising a heating system for heating a process medium. The present disclosure also relates to a method of operating a heating system for heating a process medium, and to a method of retrofitting a heating system for heating a process medium.

BACKGROUND TO THE INVENTION

In industrial processes, it may be necessary to heat a process medium such as oil, gas or another process fluid, or a solid process medium, to a target temperature, and/or to maintain the process medium at the target temperature. In such industrial processes an electrical heating system including an electric heating arrangement may be used for heating the process medium. The electrical heating system may include a power converter which, in use of the electrical heating system, receives a substantially constant input voltage. The power converter supplies, in use, a controllable output voltage to the heating arrangement. In some examples the power converter may also be configured to convert an input alternating current (AC) voltage to an output direct current (DC), or to convert an input DC voltage to an output AC voltage. The heating system may also include a voltage monitor for monitoring the voltage supplied to the heating arrangement and for controlling the power converter based on the monitored voltage supplied to the heating arrangement.

For example, U.S. Pat. No. 10,690,705 B2 discloses a system comprising a heater, a power converter including a power switch, and a controller. The power converter is coupled to the heater and is operable to apply an adjustable voltage to the heater. The controller is coupled to the power switch to control the voltage output of the power converter based on at least one of a load current and a detected voltage at the heater. The controller operates the power switch to adjust the voltage output of the power converter.

SUMMARY OF THE INVENTION

According to a first aspect, there is provided a heating system comprising: a heating arrangement for heating a process medium; an inverter configured to receive an input direct-current voltage from a power supply and to produce an intermediate alternating-current voltage; a transformer configured to receive the intermediate alternating-current voltage produced by the inverter and to supply an output alternating-current voltage to the heating arrangement; a sensor arrangement configured to generate a first sensor output signal indicative of a thermodynamic parameter of the process medium or the heating arrangement; and a controller configured to control the inverter based on the first sensor output signal.

The heating system of the first aspect is able to regulate the temperature of the process medium based on the thermodynamic parameter of the process medium or the heating arrangement, which enables more precise and accurate control of the temperature of the process medium or the heating arrangement than prior art systems which regulate the temperature of a process medium or the heating arrangement based on a monitored voltage of a heating arrangement.

The thermodynamic parameter may comprise a temperature of the process medium or the heating arrangement.

The thermodynamic parameter may comprise a sheath temperature of the heating arrangement.

The process medium may be a process fluid.

The thermodynamic parameter may comprise: a temperature of the process fluid, a density of the process fluid; a viscosity of the process fluid; or a pressure of the process fluid.

The sensor arrangement may be further configured to generate a second sensor output signal indicative of the input direct-current voltage from the power supply, and the controller may be further configured to control the inverter based on the second sensor output signal.

The sensor arrangement may comprise a thermocouple in a proximity to the process medium or the heating arrangement, and the thermocouple may be configured to generate the first sensor output signal.

Alternatively, the sensor arrangement may comprise an infrared sensor configured to generate the first sensor output signal.

The first sensor output signal may be indicative of a thermodynamic parameter of the process medium. The sensor arrangement may be further configured to generate a third sensor output signal indicative of a thermodynamic parameter of the heating arrangement. The controller may be configured to control the inverter based on the first sensor output signal and the third sensor output signal.

The process medium may be a process fluid and the sensor arrangement may be further configured to generate a fourth sensor output signal which corresponds to a velocity or a flow-rate of the process fluid. The controller may be further configured to control the inverter based on the fourth sensor output signal.

The inverter may be configured to receive an input direct-current voltage of at least 1000 V and to supply an intermediate alternating-current the transformer having a root mean square voltage of between 0 V and greater than 1000 V.

The controller may be further configured to control the inverter such that the inverter outputs, in use, an intermediate alternating-current voltage having a substantially constant frequency which matches a predetermined operating frequency of the transformer. The predetermined operating frequency of the transformer may be approximately 400 Hz, for example.

The transformer may be an isolation transformer or an auto-transformer.

The heating arrangement may comprise a plurality of heating elements.

The inverter may be a multiple-phase inverter configured to receive an input direct-current voltage from a power supply and to produce a plurality of intermediate alternating-current voltages.

The transformer may be a multiple-phase transformer configured to receive the plurality of intermediate alternating-current voltages produced by the inverter and to supply a respective output alternating-current voltage to each of the plurality of heating arrangements.

Each of the plurality of intermediate alternating-current voltages may have a different phase, relative to each of the other intermediate alternating-current voltages.

According to a second aspect, there is provided an installation comprising a heating system in accordance with the first aspect, a power supply and a heating vessel for receiving a process medium, wherein the power supply provides, in use, a substantially variable input direct-current voltage to the inverter.

The power supply may comprise at least one of: a battery; a capacitor; a supercapacitor; a solar cell; an array of solar cells; a DC supply from an electrical utility; or a rectified and/or filtered AC supply from at least one of a generator, a wind turbine and a hydroelectric turbine.

According to a third aspect, there is provided a method of operating a heating system in accordance with the first aspect or an installation in accordance with the second aspect, the method comprising: receiving an input direct-current voltage from the power supply; providing the first sensor output signal to the controller; controlling the inverter based on the first sensor output signal; and supplying an output direct-current voltage to the heating arrangement.

According to a fourth aspect, there is provided a computer-readable storage medium comprising instructions which, when executed by a processor, cause the processor to carry out the method according to the third aspect.

According to a fifth aspect, there is provided a data processing system comprising a processor configured to perform the method according to the third aspect.

According to a sixth aspect, there is provided a method of retrofitting a heating system comprising a heating arrangement for heating a process medium, the method comprising: providing an inverter to the heating system, wherein the inverter is configured to receive an input direct-current voltage from a power supply and to produce an intermediate alternating-current voltage; coupling a transformer to the heating arrangement and to the inverter, wherein the transformer is configured to receive the intermediate alternating-current voltage from the inverter and to supply an output alternating-current voltage to the heating arrangement; positioning a sensor arrangement within the heating system, wherein the sensor arrangement is configured to generate a first sensor output signal indicative of a thermodynamic parameter of the process medium or the heating arrangement; and coupling a controller to the inverter and to the sensor arrangement, wherein the controller is configured to control the inverter based on the first sensor output signal.

The inverter, the transformer, the controller, the sensor arrangement, the thermodynamic parameter and/or the power supply of the sixth aspect may comprise any of the features of the corresponding elements of any of the aspects described above.

DETAILED DESCRIPTION

Figure 1A:
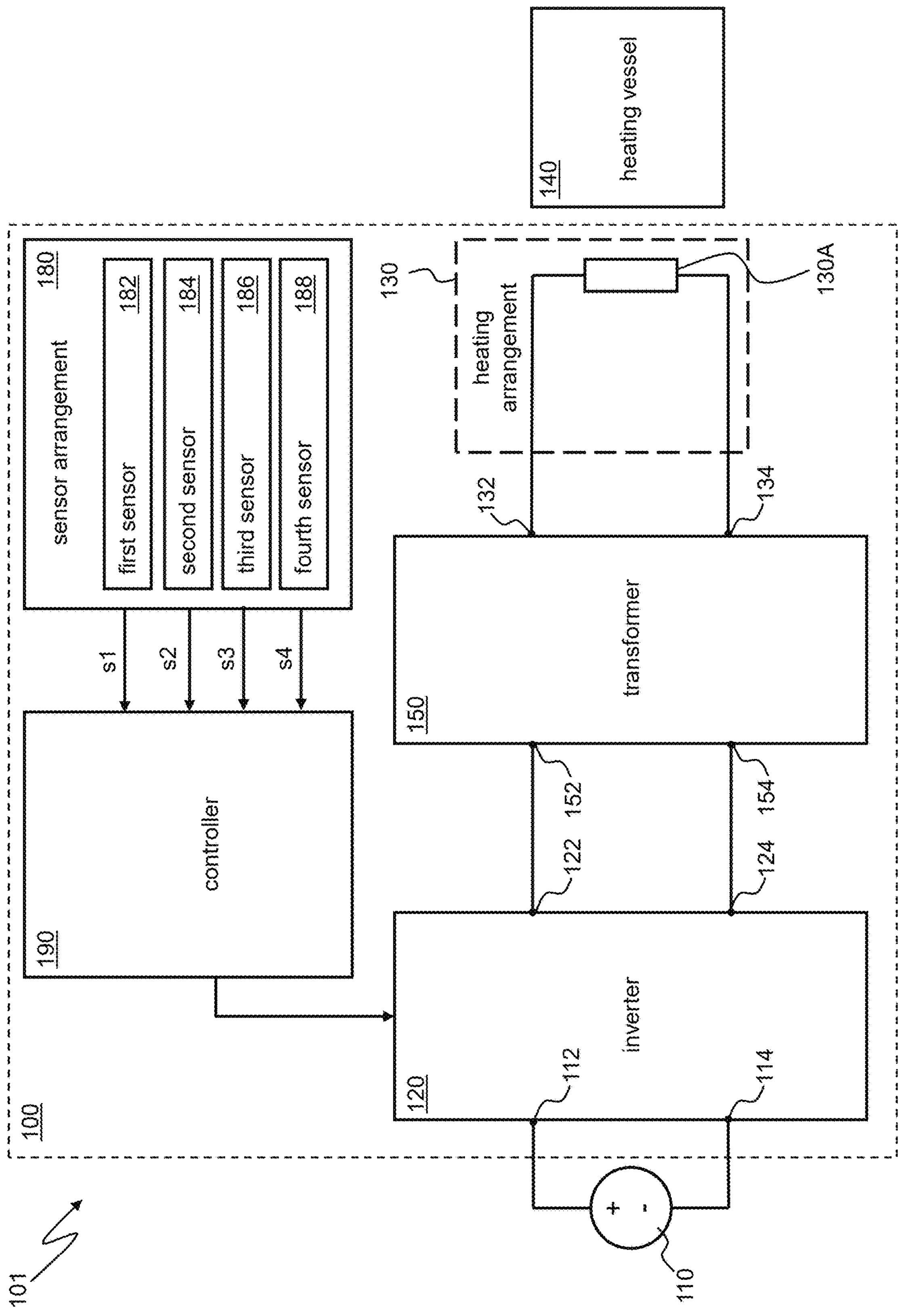
FIG. 1A shows a first example heating system and a first example installation comprising the first example heating system.

FIG. 1A shows a first example heating system 100 comprising an inverter 120, a transformer 150, a heating arrangement 130 for heating a process medium, a sensor arrangement 180 and a controller 190.

The inverter 120 is configured to receive an input direct-current (DC) voltage from a power supply 110 via a pair of inverter input terminals 112 and 114. The power supply 110 may be derived from, for example, a renewable energy source such as a solar cell or an array of solar cells, a wind turbine, a hydroelectric turbine or the like. Alternatively, the power supply 110 may comprise or be derived from a battery, a capacitor, a supercapacitor or the like.

As will be appreciated by those of ordinary skill in the art, such power supplies may not provide a DC output at a stable or constant voltage, and thus the power supply 110 may provide, in use, a substantially variable input DC voltage to the inverter 120.

The inverter 120 is configured to receive the input DC voltage from the power supply 110 and to output an intermediate alternating-current (AC) voltage via a pair of inverter output terminals 122 and 124. The transformer 150 is configured to receive the intermediate AC voltage via a pair of transformer input terminals 152 and 154. The transformer 150 steps-up or steps-down the intermediate AC voltage to generate an output alternating-current (AC) voltage. A relationship between a root mean square voltage of the intermediate AC voltage and a root mean square voltage of the output AC voltage is defined by an input:output voltage ratio of the transformer 150, which is dependent upon a ratio of a number of turns of a primary winding of the transformer 150 to a number of turns of a secondary winding of the transformer 150.

The transformer 150 supplies the output AC voltage to the heating arrangement 130 via a pair of transformer output terminals 132 and 134. The heating arrangement 130 is configured to convert electrical energy supplied thereto into heat energy by means of an Ohmic heating process. In the example of FIG. 1A, the heating arrangement 130 comprises a single heating element 130A.

The sensor arrangement 180 is configured to generate a first sensor output signal s1 which is indicative of a thermodynamic parameter (e.g. a temperature, pressure, density, viscosity or the like) of the process medium or the heating arrangement 130. The sensor arrangement 180 may comprise a first sensor 182 which is configured to generate the first sensor output signal s1.

The controller 190 is configured to control the inverter 120 based on the first sensor output signal s1. Specifically, the controller 190 is configured to control the intermediate AC voltage supplied by the inverter 120 to the transformer 150 based on the first sensor output signal s1. The controller 190 is configured to output a pulse width modulated (PWM) control signal to control the intermediate AC voltage of the inverter 120. The controller may be configured to adjust a pulse width of the PWM control signal to control a duty cycle of the inverter 120 and thereby adjust the root mean square voltage of the intermediate AC voltage outputted by the inverter 120.

As described above, the root mean square voltage of the output AC voltage is related to the root mean square voltage of the intermediate AC voltage by the input:output voltage ratio of the transformer 150. Therefore, in use, the controller 190 directly controls the output AC voltage supplied to the heating arrangement 130 by controlling the intermediate AC voltage supplied by the inverter 120 to the transformer 150.

Controlling the output AC voltage applied to the heating arrangement 130 based on the first sensor output signal s1 permits more precise and accurate control of the heating of the process medium than in known systems which control the voltage applied to a heating arrangement based on a measured voltage across the heating arrangement (or a signal indicative thereof). The measured voltage across the heating arrangement may not provide an accurate or reliable indication of the temperature of the process medium, because, for example, there may be a time-lag between a change in the voltage across the heating arrangement and a resulting change in the temperature of the process medium. Thus, controlling the voltage applied to the heating arrangement 130 based on a measured voltage across the heating arrangement (or a signal indicative thereof) may lead to undesirable undershoot or overshoot of a target temperature of the process medium.

In contrast, a thermodynamic parameter (e.g. temperature, pressure) of the process medium or the heating arrangement 130 provides a more accurate and reliable indication of the temperature of the process medium. Thus, a signal indicative of such a thermodynamic parameter provides near real-time feedback on the effects of a change in the voltage applied to the heating arrangement, such that any undershoot or overshoot of a target temperature can be corrected quickly, leading to more precise and accurate dynamic control of the temperature of the process medium.

The inverter 120 may be configured to receive an input DC voltage of at least 1000 V and the transformer 150 may be configured to supply an output AC voltage to the heating arrangement 130 having a root mean square voltage of between 0 V and at least 1000 V, depending on demand (e.g. depending on a heating demand to achieve a desired heating effect). A DC voltage or an AC voltage in this range may be referred to in this disclosure as a "medium voltage". Because the electrical power supplied to the heating arrangement 130 is equal to the product of the applied voltage and the applied current, using a medium voltage input DC voltage and/or a medium voltage output AC voltage allows a given electrical power to be supplied to the heating arrangement 130 at a lower current than would be required if a lower voltage were used. This may enable the use of smaller-gauge wiring, the use of lower rate overcurrent protection devices and/or the use of a heating arrangement 130 having a smaller size than would otherwise be required for a desired heating capacity of the heating system 100. As a result, the heating system 100 may be more easily fitted during an installation process, or more easily fitted and removed during a maintenance process.

The controller 190 may be configured to control the inverter 120 such that the inverter outputs, in use, an intermediate alternating-current voltage having a substantially constant frequency. Many commercially available transformers are configured to operate using alternating current voltages having a predetermined operating frequency. Operation of a transformer using alternating current voltages having a frequency which differs substantially from the predetermined operating frequency may lead to less effective operation of the transformer. The substantially constant frequency of the intermediate alternating-current voltage may be selected to match the predetermined operating frequency of the transformer 150. Therefore, controlling the inverter 120 such that the inverter 120 outputs, in use, an intermediate alternating-current voltage having a substantially constant operating frequency which matches the predetermined operating frequency of the transformer.

In addition, it is common for commercially available transformers to be configured to operate using alternating current voltages having a predetermined operating frequency of 50 Hz, 60 Hz or 400 Hz. A geometric size of a transformer is related to the predetermined operating frequency of the transformer, such that a transformer having a higher predetermined operating frequency is smaller than a transformer having a lower predetermined operating frequency. The transformer 150 may have a predetermined operating frequency of approximately 400 Hz, which enables a total size of the heating system 100 to be smaller than if a transformer having a predetermined operating frequency of 50 Hz or 60 Hz were used.

The transformer 150 may be, for example, an isolation transformer or an auto-transformer. Use of an isolation transformer enables the use of neutral grounding to detect faults and limit short circuit currents in use. On the other hand, use of an auto-transformer provides a less complex transformer 150.

As will be appreciated by those of ordinary skill in the art, the intermediate AC voltage produced by the inverter 120 will contain frequency components at the switching frequency of the inverter 120 and at harmonics of the switching frequency. An impedance of the transformer 150 may be sufficiently high so as to damp and/or minimise unwanted resonant effects such as high-frequency ringing in the system that may be caused, for example, by a capacitance of the heating arrangement 130. Therefore, a need for the inverter 120 to include output filter circuitry to attenuate unwanted frequency components of the intermediate AC voltage may be reduced.

The amount of heat provided to the process medium by the heating arrangement 130 in a given period of time is a function of, among other things, the resistance of the heating arrangement 130 and the root mean square voltage of the output AC voltage supplied to the heating arrangement 130 in the given period of time. Therefore, there is a relationship between the output AC voltage supplied to the heating arrangement 130 and the amount of heat generated by the heating arrangement 130. However, the heat provided to the process medium by the heating arrangement 130 is not solely a function of the output AC voltage supplied to the heating arrangement 130. The heat provided to the process medium by the heating arrangement 130 may also be a function of, for example, a thermal conductivity of a heating vessel in which the process medium is disposed.

As a result, a controller which is configured to control the inverter 120 based on a signal which is indicative of the intermediate AC voltage supplied to the transformer 150 or the output AC voltage supplied to the heating arrangement 130 may not provide a particularly effective control regime to the heating system 100; a controller which controls the inverter 120 based on a signal indicative of some other parameter, e.g. a signal indicative of a thermodynamic parameter of the process medium and/or the heating arrangement 130 may provide a more effective control regime. In addition, a controller which is configured to control the inverter 120 based on a signal which is indicative of a thermodynamic parameter of the process medium and/or the heating arrangement 130 may provide a safer control regime to the heating system 100.

In a first example, the sensor arrangement 180 is configured to generate a first sensor output signal s1 which is indicative of a thermodynamic parameter of the process medium. The controller 190 may be configured to control the inverter 120 in order to maintain the thermodynamic parameter within a predetermined target range. Preferably, the controller 190 is configured to control the inverter 120 according to any suitable combination of a proportional control term, an integral control term and/or a derivative control term in order to maintain the thermodynamic parameter within the predetermined target range.

The thermodynamic parameter may comprise, for example, a characteristic temperature of the process medium. The characteristic temperature may be representative of a maximum internal temperature of the process medium or an average internal temperature of the process medium. In some applications of the heating system 100, it is advantageous to provide a control regime which is able to precisely control the characteristic temperature of the process medium so as to ensure that the process medium is suitable for an intended purpose. The intended purpose of the process medium may be, for example, to provide heating to an external component at a predetermined temperature. In the first example, the heating system 100 may be provided with a simple control regime which allows effective and precise control of the characteristic temperature of the process medium.

In other examples in which the process medium is a process fluid, the thermodynamic parameter of the process medium may be used to indirectly calculate the characteristic temperature of the process medium. As described above, in some applications of the heating system 100, it is advantageous to provide a control regime which is able to precisely control the characteristic temperature of the process medium so as to ensure that the process medium is suitable for an intended purpose.

The process medium may be a process fluid. If so, the thermodynamic parameter of the process medium may comprise a density of the process medium, a viscosity of the process medium or a pressure of the process medium. In various applications of the heating system 100, it is advantageous to provide a control regime which is able to precisely control the density of the process medium, the viscosity of the process medium or the pressure of the process medium so as to ensure that the process medium is suitable for an intended purpose. In the first example, the heating system 100 may be provided with a simple control regime which allows an effective and precise control of a temperature of the process medium, the density of the process medium, the viscosity of the process medium or the pressure of the process medium.

In a second example, the sensor arrangement 180 is configured to generate a first sensor output signal s1 which is indicative of a thermodynamic parameter of the heating arrangement 130.

In the second example, the thermodynamic parameter may comprise an internal temperature of the heating arrangement 130. Consequently, in various examples, the controller 190 is configured to control the inverter 120 based on a first sensor output signal s1 which is indicative of the internal temperature of the heating arrangement 130. The internal temperature may be representative of a maximum internal temperature of the heating arrangement 130 or an average internal temperature of the heating arrangement 130.

The heating arrangement 130 may be associated with a critical internal temperature. The critical internal temperature may be defined as a threshold internal temperature of the heating arrangement 130 above which damage to and/or loss of function of the heating arrangement 130 is likely to result. The controller 190 may be configured to control the inverter 120 so as to ensure that the internal temperature of the heating arrangement 130 does not exceed the critical internal temperature, which provides a safer control regime to the heating system 100.

Alternatively, in the second example, the thermodynamic parameter may comprise a sheath temperature of the heating arrangement 130. Accordingly, in various examples, the controller 190 is configured to control the inverter 120 based on a first sensor output signal s1 which is indicative of the sheath temperature of the heating arrangement 130. The sheath temperature is representative of a temperature of a surface or a sheath of the heating arrangement 130 which is configured to transfer heat to the process medium by means of conduction, convection and/or radiation. A rate of heat exchange between the heating arrangement 130 and the process medium is directly related to the sheath temperature of the heating arrangement 130.

If the process medium is heated only by the heating arrangement 130, the maximum internal temperature of the process medium will not exceed the sheath temperature of the heating arrangement 130. As discussed above, in some applications of the heating system 100 it is advantageous to provide a control regime which is able to precisely control the maximum internal temperature of the process medium so as to ensure that the process medium is suitable for an intended purpose thereof.

The sensor arrangement 180 may have a rise time associated with a generation of the first sensor output signal s1. In general, a shorter rise time is related to a more accurate first sensor output signal s1, which is in turn associated with a more effective control regime for the heating system 100. This is particularly relevant to a heating system 100 which receives, in use, a substantially variable input direct-current voltage from the power supply 110. The sensor arrangement 180 may thus comprise a first sensor 182 with a short rise time. In particular, a thermocouple may have a shorter rise time than alternative types of sensor which could be used as the first sensor 182. For this reason, the sensor arrangement 180 may comprise a thermocouple which, in use of the system, is positioned in proximity to the process medium or the heating arrangement 130 and is configured to generate the first sensor output signal s1. In other words, the sensor arrangement 180 may comprise a first sensor 182 configured to generate the first sensor output signal s1, wherein the first sensor 182 is a thermocouple.

Alternatively, it may be advantageous to provide a sensor arrangement 180 which does not require the first sensor 182 to be in proximity to the process medium or the heating arrangement 130. In this case, the sensor arrangement 180 may be associated with a higher degree of safety and reliability. For instance, the first sensor 182 which is configured to generate the first sensor output signal s1 may be an infrared sensor. In other words, the sensor arrangement 180 may comprise an infrared sensor configured to generate the first sensor output signal s1.

It may be particularly advantageous to provide a sensor arrangement 180 which does not require the first sensor 182 to be in proximity to the heating arrangement 130, because the sheath temperature of the heating arrangement 180 may become sufficiently high, in use, that thermal damage to the first sensor 182 becomes likely. In examples of the heating system 100 in which the thermodynamic parameter comprises a sheath temperature of the heating arrangement 130, the sensor arrangement 180 may comprise an infrared sensor configured to generate the first sensor output signal s1.

Similarly, it may be advantageous to provide a sensor arrangement 180 which does not required the first sensor 182 to be in proximity to or disposed within the process medium. Accordingly, in examples of the heating system 100 in which the thermodynamic parameter comprises a characteristic temperature of the process medium, the sensor arrangement 180 may comprise an infrared sensor configured to generate the first sensor output signal s1.

As described above, the power supply 110 may provide, in use, a substantially variable input DC voltage to the inverter 120 of the heating system 100, and this may give rise to variations in the output AC voltage that is supplied by the transformer 150 to the heating arrangement 130 if the controller 190 does not otherwise control the inverter 120 to regulate the intermediate AC voltage outputted by the inverter 120.

A time delay between a change in the thermodynamic parameter of the process medium or the heating arrangement 130 in response to such a variation in the output AC voltage supplied by the transformer 150 is governed by a thermal response time period of the heating arrangement 130 or the process medium. If the thermal response time of the heating arrangement 130 or the process medium is long, the time delay between a change in the output AC voltage provided by the transformer 150 (as a result of a change in its input voltage) and a change in the thermodynamic parameter detected by the first sensor 182 will also be long.

Therefore, if the controller 190 is configured to control the inverter 120 based on the first sensor output signal s1 alone, a long thermal response time of the heating arrangement 130 may lead to the thermodynamic parameter rising or falling outside of a predetermined target range of a predetermined target thermodynamic parameter of the process medium or the heating arrangement 130. In other words, a long thermal response time of the heating arrangement 130 or the process medium may cause overshoots in the control regime of the heating system 100 if the controller 190 is configured to control the inverter 120 based on the first sensor output signal s1 alone.

To alleviate this, the sensor arrangement 180 may be further configured to generate a second sensor output signal s2 indicative of the input DC voltage from the power supply 110, and the controller 190 may be further configured to control the inverter 120 based on the second sensor output signal s2. The sensor arrangement 180 may therefore comprise a second sensor 184 configured to generate the second sensor output signal.

The controller 190 may calculate a prediction of a change in the thermodynamic parameter of the heating arrangement 130 or the process medium based on the second sensor output signal s2. The prediction may be based on an analytical or numerical model of the heating arrangement 130 or the process medium. The controller 190 may control the inverter 120 based on the prediction so as to maintain the thermodynamic parameter within the predetermined target range for the heating arrangement 130 or the process medium.

Controlling the inverter 120 based on both the first sensor output signal s1 and the second sensor output signal s2 may give rise to a reduced likelihood of overshoots or undershoots in the control regime of the heating system 100. Accordingly, such a configuration of the controller 190 provides the heating system 100 with a more stable control regime.

In various examples, the first sensor output signal s1 is indicative of a thermodynamic parameter of the process medium and the sensor arrangement 180 is further configured to generate a third sensor output signal s3 indicative of a thermodynamic parameter of the heating arrangement 130. The sensor arrangement 180 may therefore comprise a third sensor 186 configured to generate the third sensor output signal s3. The controller 190 may be configured to control the inverter 120 based on the first sensor output signal s1 and the third sensor output signal s3. The thermodynamic parameter of the process medium and the thermodynamic parameter of the heating arrangement 130 may be indicative of any of the parameters described above with respect to the preceding examples.

For instance, the thermodynamic parameter of the process medium may comprise the characteristic temperature of the process medium and the thermodynamic parameter of the heating arrangement 130 may comprise the internal temperature of the heating arrangement 130. The controller 190 may be configured to control the inverter 120 so as to ensure that the internal temperature of the heating arrangement 130 does not exceed the critical internal temperature while also controlling the characteristic temperature of the process medium so as to ensure that the process medium is suitable for an intended purpose. In this way, the heating system 100 is provided with a safer control regime which also allows an effective and precise control of the characteristic temperature of the process medium.

In examples in which the process medium is a process fluid, the first sensor output signal s1 is indicative of a thermodynamic parameter of the process medium and the third sensor output signal s3 is indicative of a thermodynamic parameter of the heating arrangement 130, the sensor arrangement 180 may be further configured to generate a fourth sensor output signal s4 which corresponds to a velocity or a flow rate of the process fluid. The controller 190 may be configured to control the inverter 120 based on the first sensor output signal s1, the third sensor output signal s3 and the fourth sensor output signal s4. The sensor arrangement 180 may therefore comprise a fourth sensor 188 configured to generate the fourth sensor output signal s4. The thermodynamic parameter of the process medium and the thermodynamic parameter of the heating arrangement 130 may be indicative of any of the parameters described with respect to the preceding examples.

For example, the thermodynamic parameter of the process medium may correspond to the characteristic temperature of the process medium and the thermodynamic parameter of the heating arrangement 130 may correspond to the sheath temperature of the heating arrangement 130. In this case, the controller 190 may determine a temperature differential between the characteristic temperature of the process medium and the sheath temperature of the heating arrangement 130. The temperature differential may be indicative of an efficacy of heat exchange between the heating arrangement 130 and the process medium. The controller 190 may also calculate a characteristic velocity of the process fluid or a flow-rate of the process fluid based on the fourth sensor output signal s4. The characteristic velocity may be representative of a maximum velocity of the process fluid, an average velocity of the process fluid or a velocity of the process fluid at a wall of a heating vessel in which the process fluid is disposed.

The controller 190 may calculate a rate of heating provided to the process fluid based on the determined temperature differential and the characteristic velocity of the process fluid. The controller 190 may calculate the rate of heating using, for example, an analytical equation or model such as Newton's law of cooling or a numerical model. The controller 190 may calculate or retrieve a characteristic heat transfer coefficient for use in the calculation of the rate of heating provided to the process fluid. The controller 190 may then control the inverter 120 based on the calculated rate of heating provided to the process fluid.

In various applications of the heating system 100, it is advantageous to provide a control regime which is able to effectively control the rate of heating provided to the process fluid so as to meet a predetermined heating objective of the heating system 100.

The controller 190 may be configured to control the inverter 120 in order to maintain the rate of heating provided to the process fluid within a predetermined target range of a rate of heating provided to the process fluid. The controller 190 may be configured to control the inverter 120 according to any suitable combination of a proportional control term, an integral control term and/or a derivative control term in order to maintain the rate of heating provided to the process fluid within the predetermined target range of the rate of heating provided to the process fluid. In this example, the heating system 100 is provided with a control regime which allows an effective control of the rate of heating provided to the process fluid.

In further examples, the controller 190 may be configured to control the Inverter 120 based on a combination of the first sensor output signal s1, the second sensor output signal s2 and the third sensor output signal s3. In other examples, the controller 190 may be configured to control the Inverter 120 based on a combination of the first sensor output signal s1, the second sensor output signal s2, the third sensor output signal s3 and the fourth sensor output signal s4. The technical advantages associated with each of the examples described in the preceding paragraphs apply, mutatis mutandis, to the each of combinations given in this paragraph.

FIG. 1A also shows a first example installation 101 comprising the first example heating system 100 described above, a power supply 110 and a heating vessel 140 for receiving a process medium. The power supply 110 may provide, in use, a substantially variable input direct-current voltage to the inverter 120 of the heating system 100.

In general, the power supply 110 may be derived from an electrical energy source comprising an electrical energy storage device and/or an electrical energy transducer. The power supply 110 may be indirectly derived from an alternating-current voltage source which is subsequently rectified and which may be subject to subsequent voltage regulation and/or filtering to provide a smoothed DC power supply prior to being provided to the inverter 120. The alternating-current source may be a single-phase alternating current source or a multiple-phase alternating current source. Alternatively, the power supply 110 may be more directly derived from a direct-current voltage source which may be subject to subsequent voltage regulation prior to being provided to the inverter 120.

In particular, the power supply 110 may comprise or be derived from, for example a battery, a capacitor, a supercapacitor, a solar cell, an array of solar cells (that is, a solar field) or a DC supply from an electrical utility. Alternatively (or additionally), the power supply 110 may comprise or be derived from a rectified AC power supply from, for example, a generator, a wind turbine and/or a hydroelectric turbine.

In examples in which the power supply 110 is derived from a solar cell (or a solar field or array of solar cells), a voltage output of the solar cell is related to a magnitude of solar radiation incident to the solar cell. Accordingly, the power supply 110 may not provide a stable constant DC input voltage, but may instead provide, in use, a substantially variable DC input voltage to the inverter 120 of the heating system 100. Similarly, in examples in which the power supply 110 is derived from a battery, a capacitor, a supercapacitor, a generator, a wind turbine and/or a hydroelectric turbine, the power supply 110 may not provide a stable constant DC input voltage but may instead provide a substantially variable DC input voltage, due to variations in the pressure or flow rate of wind or water that drives a turbine, or discharge over time or through use of a battery capacitor or supercapacitor.

Figure 1B:
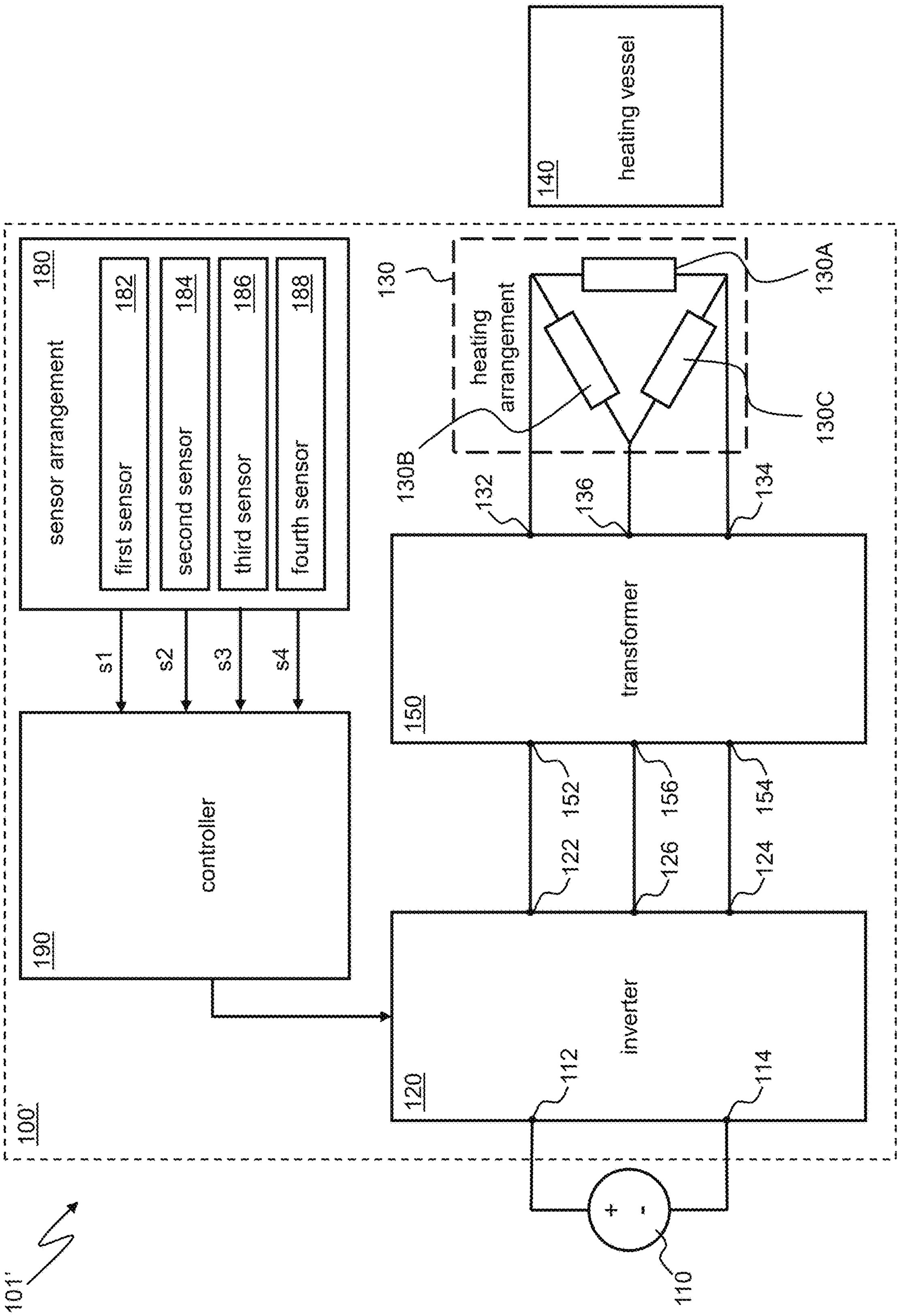
FIG. 1B shows a second example heating system and a second example installation comprising the second example heating system.

FIG. 1B shows a second example heating system 100'. The second example heating system 100' shares many common features with the first example heating system 100 shown in FIG. 1A, with like reference numerals indicating similar components.

However, in the example of FIG. 1B, the heating arrangement 130 comprises a plurality of heating elements 130A-130C. In addition, the inverter 120 is a multiple phase inverter, and is therefore configured to receive the input DC voltage from a power supply 110 and to output a plurality of intermediate alternating-current (AC) voltages via a triplet of inverter output terminals 122, 124 and 126. Each of the plurality of intermediate AC voltages have a different phase relative to each of the other intermediate alternating-current voltages.

Similarly, the transformer 150 is a multiple-phase transformer and is configured to receive the plurality of intermediate AC voltages via a triplet of transformer input terminals 152, 154 and 156. The transformer 150 steps-up or steps-down each of the plurality of intermediate AC voltages to generate a corresponding plurality of output AC voltages. The transformer 150 supplies a respective output AC voltage to each of the plurality of heating elements 130A-130C of the heating arrangement via a triplet of transformer output terminals 132, 134 and 136.

The supply of a plurality of output AC voltages to the heating arrangement 130 allows a given electrical power to be supplied to the heating arrangement 130 at a lower current than would be required if only a single output AC voltage were used. This may enable the use of smaller-gauge wiring, the use of lower rated overcurrent protection devices and/or the use of a heating arrangement 130 having a smaller size than would otherwise be required for a desired heating capacity of the heating system 100. As a result, the heating system 100 may be more easily fitted during an installation process, or more easily fitted and removed during a maintenance process.

In addition, the supply of a respective output AC voltage having a different phase relative to each of the other intermediate alternating-current voltages to each the plurality of heating elements 130A-130C provides a smoother transfer of heat from the heating arrangement 130 to the process medium, because there is never a point in time, in use, when the applied voltage or the applied current within the heating arrangement 130 is zero.

FIG. 1B also shows a second example installation 101' comprising the second example heating system 100' described above, a power supply 110 and a heating vessel 140 for receiving a process medium.

The controller(s) described herein may comprise a processor. The controller or processor may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU), to the stated functions for which the controller or processor is configured.

Figure 2:
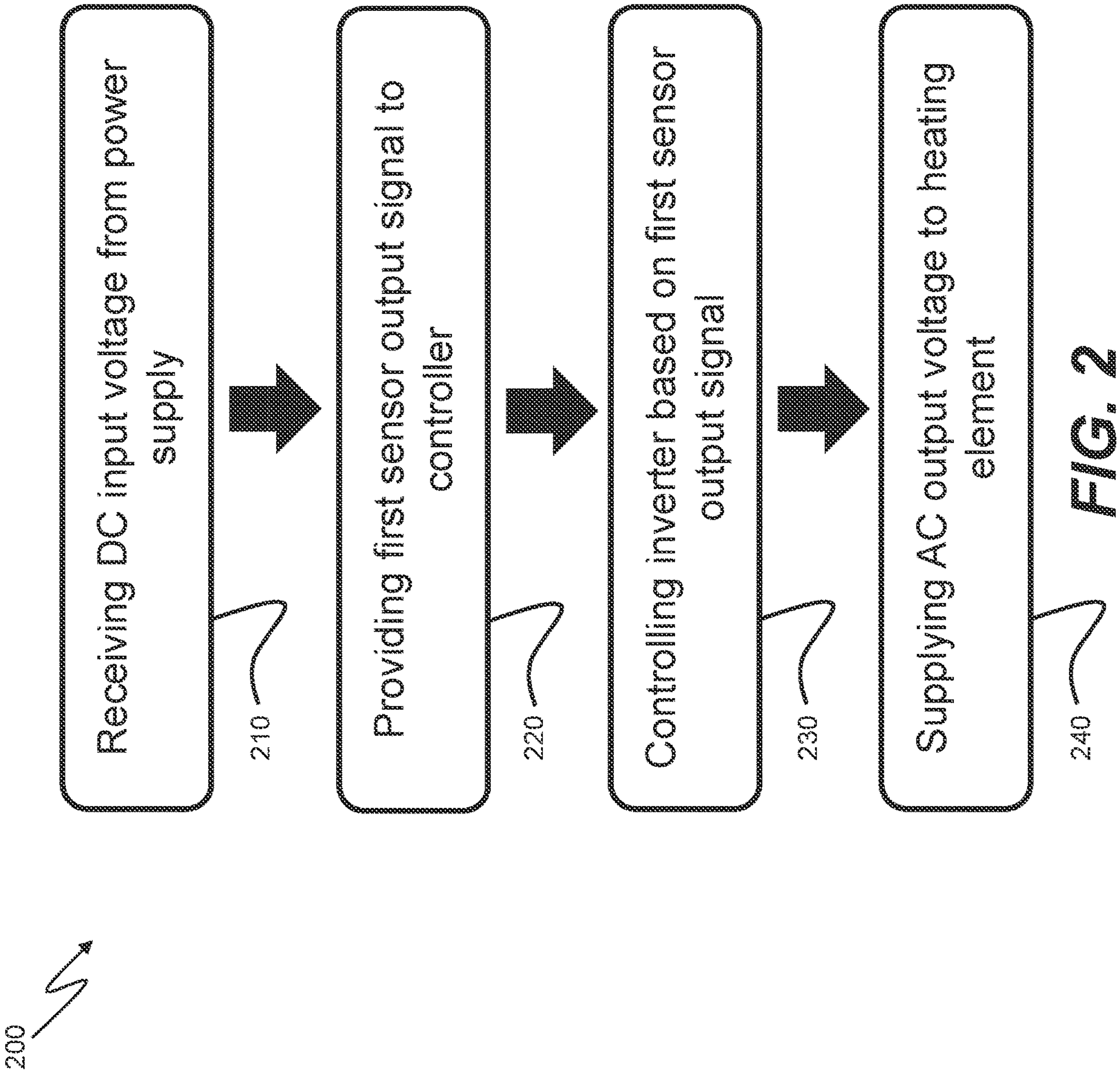
FIG. 2 is a flowchart which shows a method of operating the example heating system shown in FIG. 1.

FIG. 2 is a flowchart which shows a method 200 of operating the heating system 100 or the installation 101 as described above with reference to FIG. 1A or FIG. 1B.

The method 200 comprises a step 210, which includes receiving an input direct-current voltage from the power supply 110 via the pair of input inverter terminals 112 and 114. The input direct-current voltage is received by the inverter 120, which outputs an intermediate alternating-current voltage via the pair of inverter output terminals 122 and 124. The intermediate alternating-current voltage is in turn received by the transformer 150 via the pair of transformer input terminals 152 and 154.

The method 200 also comprises a step 220, in which the first sensor output signal s1 is provided to the controller 190. Step 220 may also comprise providing the second sensor output signal s2 to the controller 190, the third sensor output signal s3 to the controller 190 and/or the fourth sensor output signal s4 to the controller 190, as described above with reference to FIG. 1A or FIG. 1B.

In addition, the method 200 includes a step 230, which comprises controlling the inverter 120 based on the first sensor output signal s1 using the controller 190. Step 230 may also comprise controlling the inverter 120 based on the second sensor output signal s2, the third sensor output signal s3, and/or the fourth sensor output signal s4 as described above in relation to FIG. 1A or FIG. 1B.

Further, the method 200 comprises a step 240, which includes supplying an output AC voltage from the transformer 150 to the heating arrangement 130.

Figure 3A:
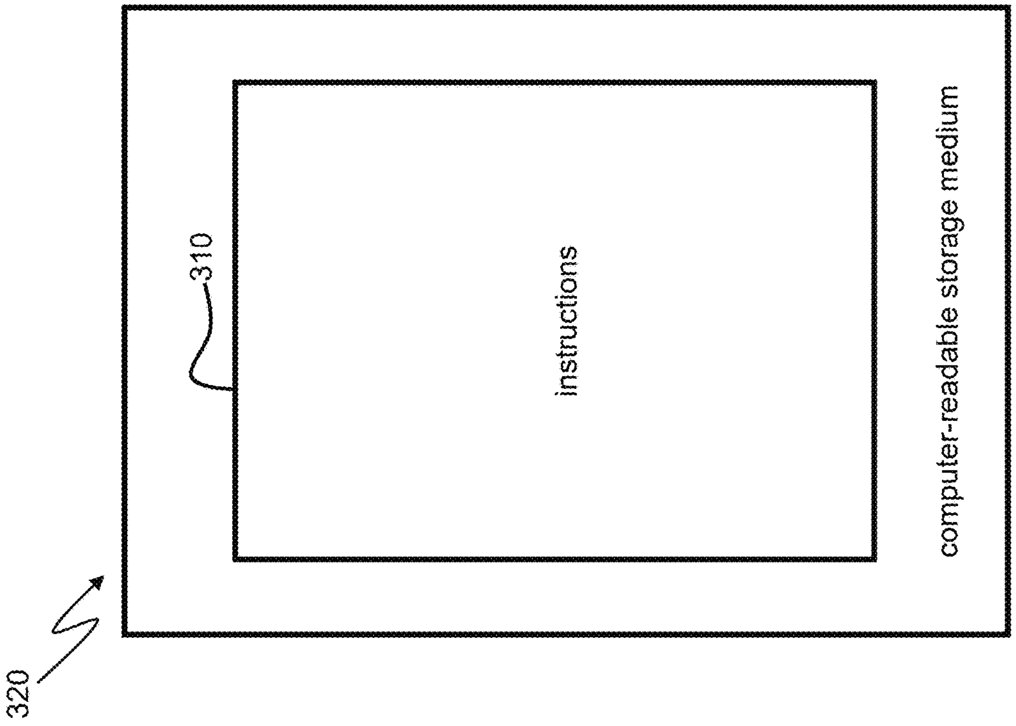
FIG. 3A shows a computer-readable storage medium comprising instructions which, when executed by a processor, cause the processor to carry out the method shown in FIG. 2.

FIG. 3A shows an example computer-readable storage medium 320 comprising instructions 310 which, when executed by a processor, cause the processor to carry out the method described with respect to FIG. 2. The computer-readable storage medium 320 may be any suitable non-transitory computer readable storage medium, data storage device or devices, and may comprise a hard disk and/or solid-state memory (such as flash memory). In some examples, the instructions 310 may be transferred to the computer-readable storage medium 320 via a wireless signal or via a wired signal.

Figure 3B:
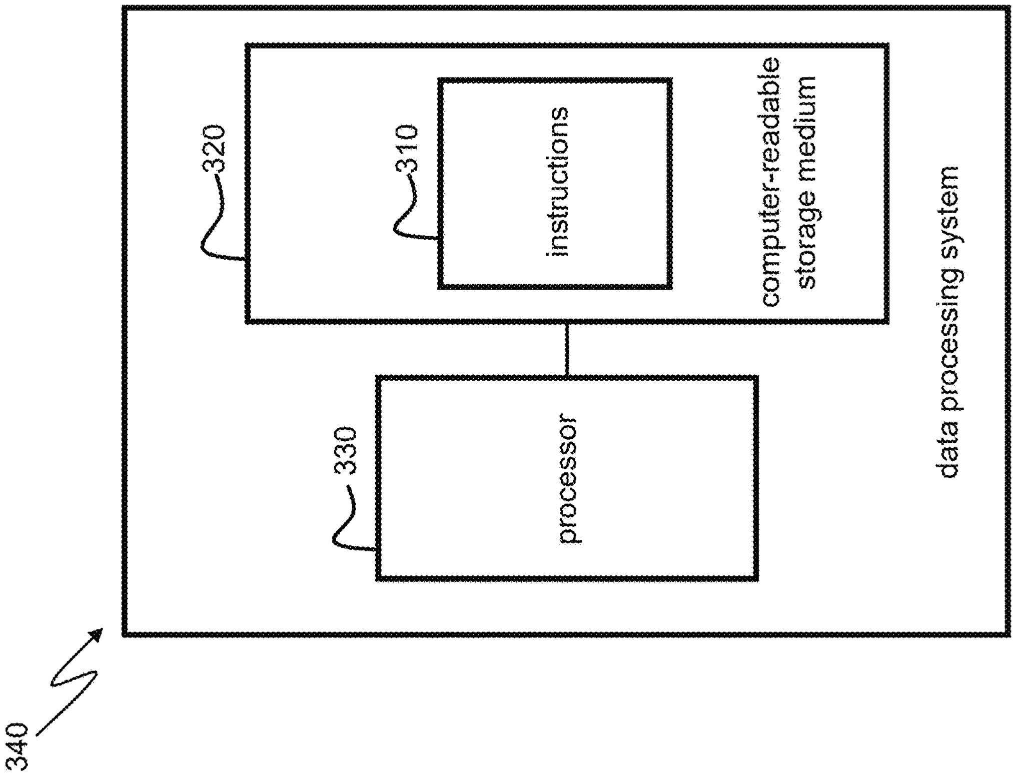
FIG. 3B shows a data-processing system comprising a processor configured to carry out the method shown in FIG. 2.

FIG. 3B shows an example data processing system 340 comprising a processor 330 configured to perform the method described with respect to FIG. 2. In the example of FIG. 3B, the data processing system 340 further comprises the computer-readable storage medium 320 comprising the instructions 310 described with respect to FIG. 3A, wherein the processor 330 is configured to communicate with the computer-readable storage medium 320 and to execute the instructions 310 to carry out the method described with respect to FIG. 2.

Figure 4:
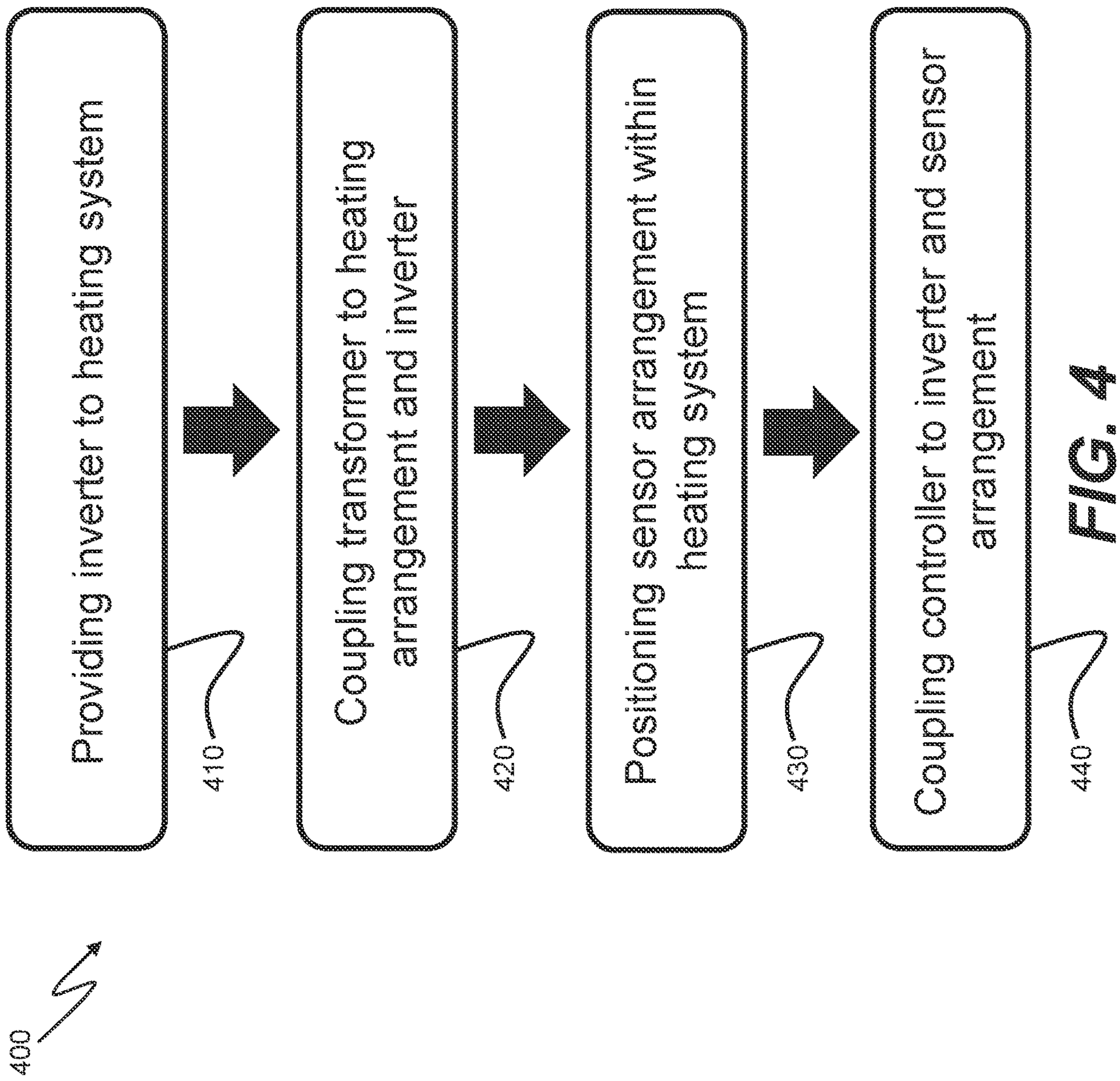
FIG. 4 is a flowchart which shows a method of retrofitting a heating system.

FIG. 4 a flowchart which shows a method 400 of retrofitting a heating system comprising a heating arrangement for heating a process medium.

The method comprises a step 410, which includes providing an inverter to the heating system, wherein the inverter is configured to receive an input direct-current voltage from a power supply and to output an intermediate alternating-current voltage. The inverter may have any of the features described above in relation to the inverter 120 and with respect to FIG. 1A or FIG. 1B. Likewise, the power supply may have any of the features described above in relation to the power supply 110 and with respect to FIG. 1A or FIG. 1B.

The method 400 includes a step 420, which comprises coupling a transformer to the heating arrangement, wherein the transformer is configured to receive the intermediate alternating-current voltage from the inverter and to supply an output alternating-current voltage to the heating arrangement. The transformer may have any of the features described above in relation to the transformer 120 and with respect to FIG. 1A or FIG. 1B.

The method 400 also includes a step 430, which comprises positioning a sensor arrangement within the heating system, wherein the sensor arrangement is configured to generate a first sensor output signal indicative of a thermodynamic parameter of the process medium or the heating arrangement. The thermodynamic parameter may be of the kind described in any of the examples described above with respect to the heating system 100 and FIG. 1A. Similarly, the sensor arrangement may have any of the features described above in relation to the sensor arrangement 180 and with respect to FIG. 1A or FIG. 1B.

The method 400 further comprises a step 440, which includes coupling a controller to the inverter and to the sensor arrangement, wherein the controller is configured to control the inverter based on the first sensor output signal. The controller may have any of the features described above with respect to the controller 190 and in relation to FIG. 1A or FIG. 1B.

Except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

The invention claimed is:

1. A heating system comprising:

a heating arrangement for heating a process medium;

an inverter configured to receive an input direct-current voltage from a power supply and to output an intermediate alternating-current voltage;

a transformer coupled to the heating arrangement and configured to receive the intermediate alternating-current voltage outputted by the inverter and to supply an output alternating-current voltage to the heating arrangement;

a sensor arrangement configured to generate a first sensor output signal indicative of a thermodynamic parameter of the process medium or the heating arrangement; and a controller configured to output a pulse width modulated control signal to control the intermediate alternating-current voltage of the inverter based on the first sensor output signal, wherein the controller is further configured to output the pulse width modulated control signal to control the inverter such that the intermediate alternating-current voltage has a constant frequency which matches a predetermined operating frequency of the transformer, the predetermined operating frequency of the transformer being greater than 60 Hz.

2. The heating system of claim 1, wherein the thermodynamic parameter comprises a temperature of the process medium or the heating arrangement.

3. The heating system of claim 1, wherein the thermodynamic parameter comprises a sheath temperature of the heating arrangement.

4. The heating system of any claim 1, wherein the process medium comprises a process fluid.

5. The heating system of claim 4, wherein the thermodynamic parameter comprises: a temperature of the process fluid, a density of the process fluid; a viscosity of the process fluid; or a pressure of the process fluid.

6. The heating system of claim 1, wherein the sensor arrangement is further configured to generate a second sensor output signal indicative of the input direct-current voltage from the power supply, and wherein the controller is further configured to control the inverter based on the second sensor output signal.

7. The heating system of claim 1, wherein the sensor arrangement comprises a thermocouple, and wherein the thermocouple is configured to generate the first sensor output signal.

8. The heating system of claim 1, wherein the sensor arrangement comprises an infrared sensor configured to generate the first sensor output signal.

9. The heating system of claim 1, wherein:

the first sensor output signal is indicative of a thermodynamic parameter of the process medium;

the sensor arrangement is further configured to generate a third sensor output signal indicative of a thermodynamic parameter of the heating arrangement; and the controller is configured to control the inverter based on the first sensor output signal and the third sensor output signal.

10. The heating system of claim 9, wherein:

the process medium is a process fluid;

the sensor arrangement is further configured to generate a fourth sensor output signal which corresponds to a velocity or a flow-rate of the process fluid; and the controller is further configured to control the inverter based on the fourth sensor output signal.

11. The heating system of claim 1, wherein the inverter is configured to receive an input direct-current voltage of at least 1000 V and the transformer is configured to supply an output alternating-current voltage to the heating arrangement having a root mean square voltage of at least 1000 V.

12. The heating system of claim 1, wherein the transformer is an isolation transformer or an auto-transformer.

13. The heating system of claim 1, wherein the heating arrangement comprises a plurality of heating elements;

the inverter is a multiple-phase inverter configured to receive an input direct-current voltage from the power supply and to output a plurality of intermediate alternating-current voltages; and the transformer is a multiple-phase transformer configured to receive the plurality of intermediate alternating-current voltages outputted by the inverter and to supply a respective output alternating-current voltage to each of the plurality of heating elements.

14. An installation comprising a heating system in accordance with claim 1, the power supply and a heating vessel for receiving a process medium, wherein the power supply provides, in use, a substantially variable input direct-current voltage to the inverter.

15. The installation of claim 14, wherein the power supply comprises at least one of:

a battery;

a capacitor;

a supercapacitor;

a solar cell;

an array of solar cells;

a DC supply from an electrical utility; or a rectified and/or filtered AC supply from at least one of a generator, a wind turbine and a hydroelectric turbine.

16. A method of operating the heating system of claim 1, the method comprising:

receiving an input direct-current voltage from the power supply;

providing the first sensor output signal to the controller;

controlling the inverter based on the first sensor output signal; and supplying an output alternating-current voltage to the heating arrangement.

17. A non-transitory computer-readable storage medium comprising instructions which, when executed by a processor, cause the processor to carry out the method of claim 16.

18. A data processing system comprising a processor configured to perform the method of claim 16.

19. The heating system of claim 1, wherein the predetermined operating frequency of the transformer is 400 Hz.

20. A method of retrofitting a heating system comprising a heating arrangement for heating a process medium, the method comprising:

providing an inverter to the heating system, wherein the inverter is configured to receive an input direct-current voltage from a power supply and to output an intermediate alternating-current voltage;

coupling a transformer to the heating arrangement and to the inverter, wherein the transformer is configured to receive the intermediate alternating-current voltage from the inverter and to supply an output alternating-current voltage to the heating arrangement;

positioning a sensor arrangement within the heating system, wherein the sensor arrangement is configured to generate a first sensor output signal indicative of a thermodynamic parameter of the process medium or the heating arrangement; and coupling a controller to the inverter and to the sensor arrangement, wherein the controller is configured to output a pulse width modulated control signal to control the intermediate alternating-current voltage of the inverter based on the first sensor output signal, and wherein the controller is further configured to output the pulse width modulated control signal to control the inverter such that the intermediate alternating-current voltage has a constant frequency which matches a predetermined operating frequency of the transformer, the predetermined operating frequency of the transformer being greater than 60 Hz.

* * * * *